United States Patent [19]

Chin et al.

[11] Patent Number: 5,264,767
[45] Date of Patent: Nov. 23, 1993

[54] ELECTRO-HYDRAULIC CONTROL APPARATUS FOR IMPROVED HYDRAULIC PRESSURE CONTROL

[75] Inventors: Yuen-Kwok Chin; William C. Lin, both of Troy; Philip M. Headley, Brighton; Prakash K. Kulkarni, Novi; David M. Sidlosky, Huntington Woods, all of Mich.

[73] Assignees: General Motors Corporation, Detroit, Mich.; Delco Electronics Corp., Kokomo, Ind.

[21] Appl. No.: 824,245

[22] Filed: Jan. 21, 1992

[51] Int. Cl.$^5$ .............................. H02P 7/00; B60T 8/34
[52] U.S. Cl. ........................... 318/560; 318/616; 318/618; 318/430; 303/100; 303/115.2
[58] Field of Search ............... 318/138, 139, 254, 292, 318/599-632, 430-467, 293, 294; 388/829, 830, 831, 915; 60/431, 432, 475, 476, 911, 421; 91/361, 363 R; 364/580, 510, 426.02; 303/115 EC, 119 R, 68, 113 SS, DIG. 6, 109, 100, DIG. 4, 103, 104, 110, 95; 188/181 A, 181 C, 72.1

[56] References Cited

U.S. PATENT DOCUMENTS

| | | | |
|---|---|---|---|
| 3,824,438 | 7/1974 | Wiebe | 318/631 |
| 4,139,809 | 2/1979 | Leichle | 318/341 |
| 4,409,531 | 10/1983 | Bjurstrom | 318/613 |
| 4,568,863 | 2/1986 | Ruof | 318/269 |
| 4,571,530 | 2/1986 | Sweeney, Jr. | 318/594 |
| 4,760,316 | 7/1988 | Hedlund | 318/254 |
| 4,841,165 | 6/1989 | Bowles | 307/132 R |
| 4,917,445 | 4/1990 | Leppek et al. | 303/100 |
| 4,997,237 | 3/1991 | Richer et al. | 303/115 |
| 5,000,524 | 3/1991 | Savage | 303/115 |
| 5,071,199 | 12/1991 | Spadafora et al. | 303/100 |
| 5,080,447 | 1/1992 | Leppek et al. | 303/100 |
| 5,102,207 | 4/1992 | Leppek et al. | 303/115 EC |
| 5,106,171 | 4/1992 | Leppek et al. | 303/100 |
| 5,139,315 | 8/1992 | Walenty et al. | 303/95 |
| 5,152,588 | 10/1992 | Bright et al. | 303/115 EC |
| 5,180,214 | 1/1993 | Yeh et al. | 303/111 |
| 5,184,299 | 2/1993 | Hogan et al. | 364/426.02 |

*Primary Examiner*—Paul Ip
*Attorney, Agent, or Firm*—Mark A. Navarre

[57] ABSTRACT

An improved method of controlling an electro-hydraulic control system by developing a motor control command in relation to the desired force to be exerted by an electric motor on a mechanical element whose displacement determines the hydraulic pressure. The control command is comprised of two magnitude signals. The first magnitude signal must be sufficient to exert enough force to overcome a static friction characteristic of the mechanical element, and the second magnitude signal is selected to achieve a desired average current or voltage over that control period. The time constant for the control command is less than the mechanical time constant of the system, but greater than the the electrical time constant of the system. The control command may be implemented by using either current or voltage control.

4 Claims, 5 Drawing Sheets

ELECTRO-HYDRAULIC CONTROL APPARATUS FOR IMPROVED HYDRAULIC PRESSURE CONTROL

This invention relates to a control apparatus for an electro-hydraulic control system including an electric motor which exerts force on a piston to modulate the hydraulic pressure, and more particularly to the generation of control commands for operation of the electric motor to minimize the effect of static frictional forces on the hydraulic system.

BACKGROUND OF THE INVENTION

In an electro-hydraulic control system, an electronic controller controls an electric motor drivingly connected to a displaceable mechanical element which exerts force or pressure on hydraulic fluid. In turn, the hydraulic fluid pressure effectuates control of an output element of the hydraulic system. The electronic controller develops a motor control command for application to the electric motor to exert a force to achieve the desired control of the hydraulic system. The control command causes the electric motor to operate in a forward or a reverse direction at a specified torque. The control command includes a magnitude signal that varies in relation to the desired motor torque and a polarity signal that determines the direction of applied force.

In an ideal electro-hydraulic system, a direct relation exists between the control command and the desired effect on the mechanical element. The direct relationship between the control command and the resulting displacement of the mechanical element enables accurate pressure control for the hydraulic system. However, because of static friction of the mechanical element, it is difficult to actually achieve a direct relation between a given control command and displacement of the mechanical element. The static friction is the frictional force operating on the mechanical element to resist displacement from a resting position. Accordingly, if the mechanical element is at rest and the motor control command directs the motor to exert force, static friction may inhibit displacement of the mechanical element, making hydraulic pressure control difficult.

Electro-hydraulic control systems overcome such frictional forces using a variety of control methods. One method involves increasing the magnitude of a control command in successive steps until the force exerted by the electric motor overcomes the static friction. However, it is unknown exactly when static friction will be overcome and the mechanical element will begin to move. Because the magnitude of the control command is continually increased to effectuate displacement and the required displacement force is unknown, an imprecise relationship exists between control command magnitude and mechanical element displacement.

A second method of overcoming static friction involves establishing a base magnitude signal for a command in accordance with the desired hydraulic control, then substantially increasing that magnitude for a portion of the overall command duration. This temporary increase in magnitude occurs at the beginning of the command period, and is of a fixed magnitude and duration. Because the temporary magnitude increase must be of a duration greater than the response time of the mechanical element and the pressure-magnitude relationship is unknown, a direct relationship between the magnitude of the command and movement of the mechanical element remains difficult to establish.

SUMMARY OF THE PRESENT INVENTION

The present invention is directed to an improved method of controlling an electro-hydraulic control system by developing a control command signal in relation to a desired force to be exerted by an electric motor on a mechanical element whose displacement determines the hydraulic pressure. The mechanical element possesses a static friction characteristic such that the resistance to movement is greatest when the mechanical element is at rest and is substantially reduced when the mechanical element is in motion. The control command is of a specified duration and is comprised of two magnitudes. The first magnitude must be sufficient to exert enough force to overcome the static friction characteristic of the mechanical element, and the second magnitude is selected to achieve a desired average current or voltage over that control period.

Both the electric motor and the mechanical element possesses inherent time response characteristics determined by the respective electrical and mechanical time constants. Typically the electrical time constant is substantially smaller than the mechanical time constant, indicating that the motor responds faster to a change in the control command than does the mechanical system. The duration of the control command relates to both time constants. According to this invention, the time duration of the control command period exceeds the electrical time constant, but is less than the mechanical time constant. This enables the motor to generate sufficient torque to displace the piston and also provides for a sufficient update rate to realize satisfactory performance of the hydraulic system.

According to a first embodiment of the invention, the control command comprises a first interval of maximum current magnitude followed by a second interval of zero current magnitude. The maximum current magnitude insures that the static friction of the mechanical element will be overcome to initiate movement of the mechanical element. The zero current magnitude yields an average current for overall control command.

During application of zero current, braking displacement of the mechanical element occurs by one of two methods. First, at zero current, the mechanical element may be allowed to coast to a stop, called coast braking. Alternatively, the induced back-emf of the electric motor may be circulated through the motor windings to generate a force opposing displacement of the mechanical element, thereby decreasing the time required for the motor to stop, called dynamic braking.

According to a second embodiment of the invention, the control command comprises a first interval of maximum voltage magnitude, such as battery voltage, followed by a second interval of zero voltage magnitude. In a similar manner to the first embodiment, the maximum voltage insures that the static friction of the mechanical element will be overcome to initiate movement of the mechanical element, and the application of zero voltage magnitude yields an average voltage for the overall control command. This embodiment also implements coast braking and dynamic braking in a similar manner to that described for the first embodiment.

DETAILED DESCRIPTION OF THE INVENTION

Figure 1:
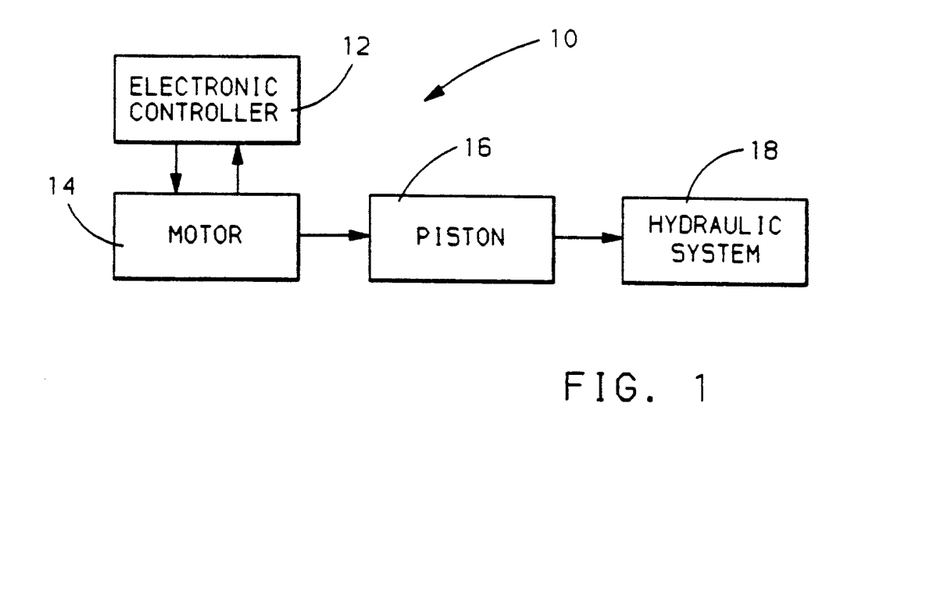
FIG. 1 is a block diagram of an electro-hydraulic control system including an electronic controller.

FIG. 1 depicts an electro-hydraulic control system 10 which includes an electronic controller 12, a motor 14, a mechanical element, represented herein as a piston 16, and a hydraulic system 18. The hydraulic system 18 typically comprises hydraulic fluid on which piston 16 exerts pressure varying in relation to its displacement. The hydraulic fluid in turn exerts pressure on an output element of the hydraulic system, resulting in control of that output element. By constantly displacing piston 16 to vary hydraulic fluid pressure, the output element may be continuously regulated.

Motor 14 is drivingly connected to piston 16 so that upon energization, motor 14 exerts force on piston 16 to displace it and modulate hydraulic system pressure. When motor 14 operates in a forward direction, piston 16 applies pressure on the hydraulic system, and when motor 14 operates in a reverse direction, piston 16 releases pressure on the hydraulic system 18. By varying the torque exerted by motor 14, the rate of change of displacement of piston 16 and the rate of change of pressure applied by the hydraulic fluid also vary. Electronic controller 12 determines the desired hydraulic pressure and develops a control command for application to motor 14. The control command energizes motor 14 to displace piston 16 in a specified direction at a specified torque. An example of such an electrohydraulic system is disclosed in U.S. Pat. No. 4,917,445, issued on Apr. 17, 1990, and assigned to the assignee of the present invention.

Figure 2:
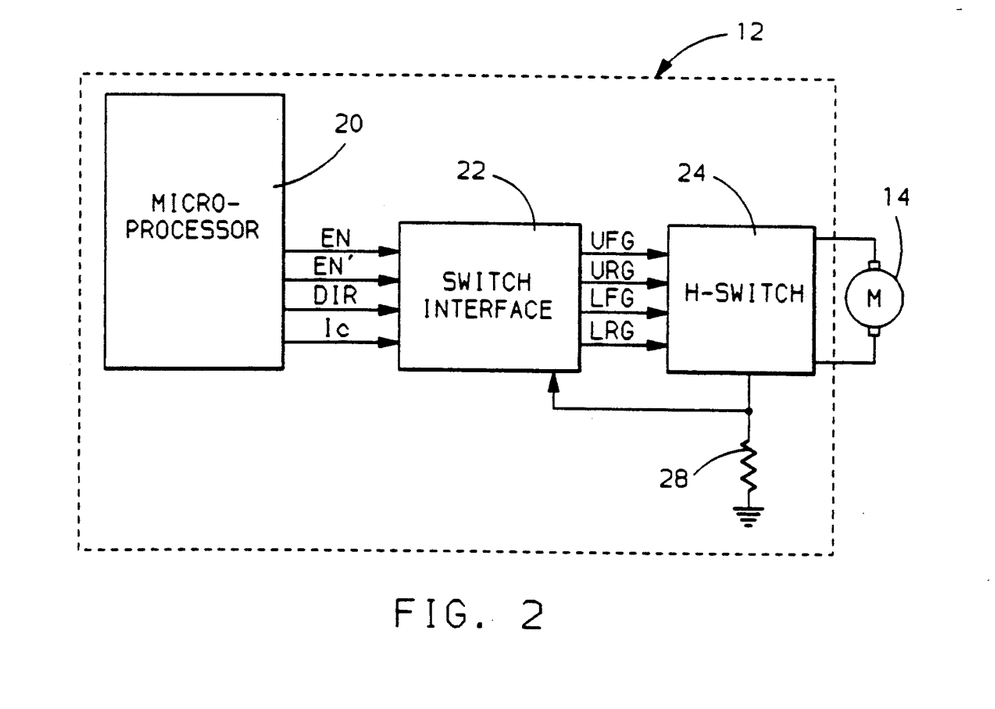
FIG. 2 is an expanded block diagram of the electronic controller shown in FIG. 1.

FIG. 2 is an expanded block diagram of electronic controller 12. The controller includes a microprocessor 20 which determines the desired and actual hydraulic control pressures and generates a control command, embodied as four control signals (EN, EN', DIR, Ic), which determine the direction and torque of motor 14 to achieve the desired hydraulic pressure. Switch interface 22 decodes the control signals into H-switch gate signals (UFG, URG, LFG, LRG) which activate the individual switching elements of H-switch 24. The outputs of H-switch 24 connect to the terminals of motor 14 to energize the motor windings (not shown). Sense resistor 28 provides a feedback mechanism to switch interface 22 to enable motor current regulation.

Figure 3:
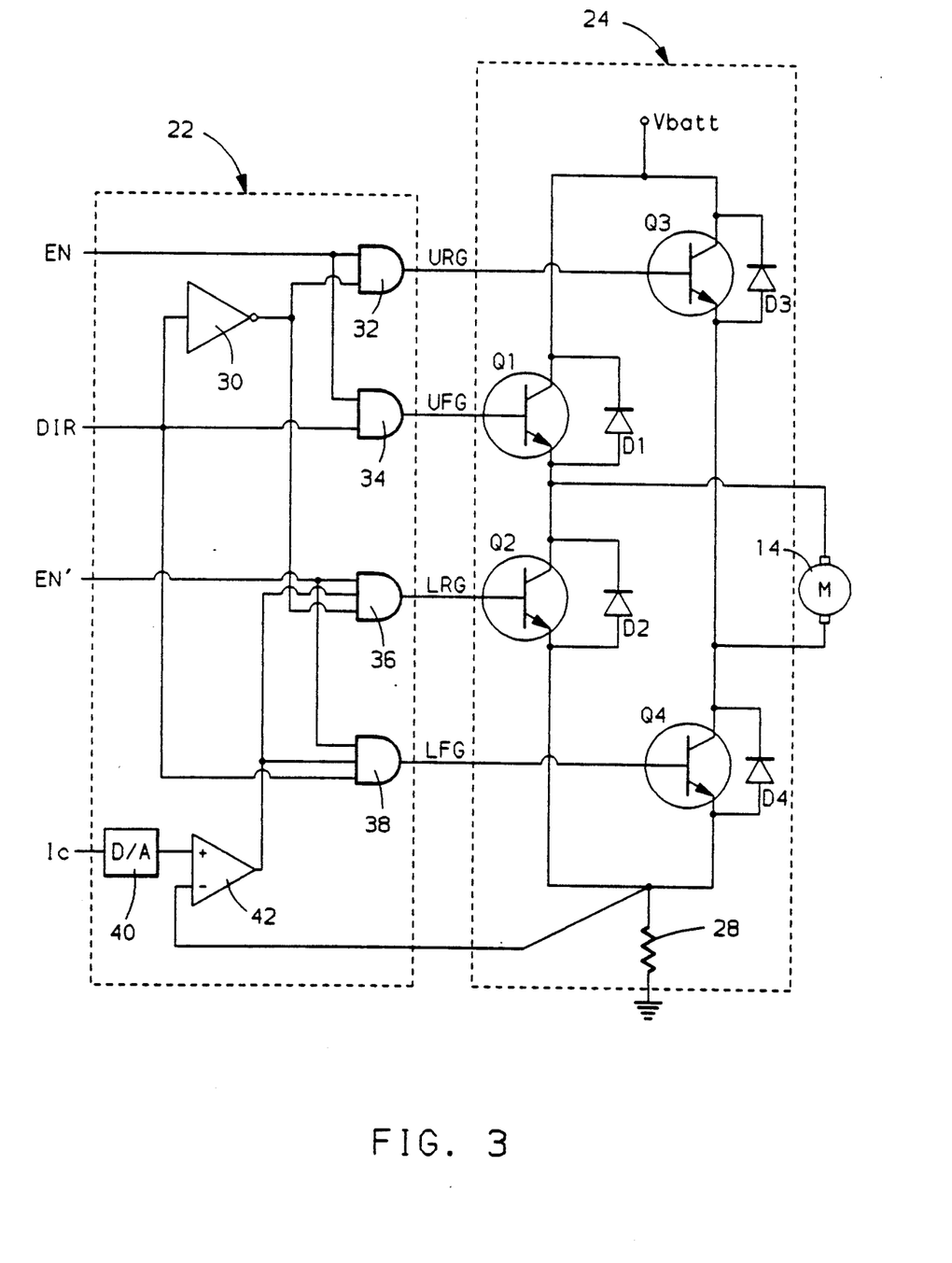
FIG. 3 depicts a circuit diagram of the switch interface and the H-switch components of the electronic controller of FIG. 1.

A circuit diagram of switch interface 22 and H-switch 24 for a first embodiment is depicted in FIG. 3. Switch interface 22 decodes the control signals provided by microprocessor 20. Enable signals EN and EN' enable the upper and lower gates of H-switch 24, respectively. When EN is high, actuation of the upper gates of H-switch 24 is enabled, and when EN is low, the upper gates of H-switch 24 are disabled. Correspondingly, when EN' is high, actuation of the lower gates of H-switch 24 is enabled, and when EN' is low, actuation of the lower gates of H-switch 24 is disabled. Both EN and EN' must be in a high state in order to energize motor 14. The direction signal DIR determines the direction of rotation of motor 14, where DIR in a high state directs motor rotation in a forward direction, and DIR in a low state directs motor rotation in a reverse direction. Current magnitude Ic indicates the desired level of current flow through the motor windings.

Switch interface 22 outputs four gate signals which activate the individual gates of H-switch 24 to effectuate current flow through the motor windings. To effectuate forward rotation of motor 14, upper forward gate (UFG) transistor Q1 and lower forward gate (LFG) transistor Q4 are activated. To effectuate reverse rotation of motor 14, upper reverse gate (URG) transistor Q3 and lower reverse gate (LRG) transistor Q2 are activated. Freewheeling diodes D1, D2, D3, and D4 are connected in parallel across the collector-emitter circuits of transistors Q1, Q2, Q3, and Q4, respectively.

In order to effectuate forward rotation of motor 14, microprocessor 20 sets EN, EN' and DIR signals high, and also outputs a desired current magnitude Ic. The output from inverter 30 will then be low. The output from AND gate 32 will be low, biasing Q3 non-conductive. Because EN and DIR are high, the output from AND gate 34 will be high, biasing Q1 conductive, creating a current path from positive battery voltage to one terminal of the motor 14. Because the output from inverter 30 is low, the output from AND gate 36 will also be low, biasing Q2 non-conductive. Because EN' and DIR are high, the output from AND gate 38 will depend upon the output from comparator 42.

Current magnitude Ic is input as a digital signal to D/A converter 40. The digital signal is converted to an analog Ic signal and input to the non-inverting input of comparator 42. To the inverting input of comparator 42 is connected a feedback voltage representative of the current through sense resistor 28. The value of sense resistor 28 is predetermined, and the voltage drop across it indicates the current flowing through the motor windings. Comparator 42 compares the armature current to the analog Ic signal output from D/A converter 40. If the armature current is less than the analog Ic signal, the output from comparator 42 and AND gate 38 will be high, biasing Q4 conductive and enabling current flow through the motor, resulting in forward rotation of motor 14. When the armature current rises above the analog Ic signal, the output from comparator 42 and AND gate 38 will be low, biasing Q4 non-conductive. Thus the feedback mechanism is used to provide bang-bang or hysteresis control about the desired current level Ic by selectively activating Q4.

In order to effectuate reverse rotation of motor 14, microprocessor 20 sets enable signals EN and EN' high and direction signal DIR low, and also outputs a desired magnitude Ic. The output from AND gate 34 will be low, biasing Q1 non-conductive. Because EN and the output of inverter 30 are high, the output from AND gate 32 will be high, biasing Q3 conductive, creating a current path from positive battery voltage to one terminal of the motor 14. Because DIR is low, the output from AND gate 38 will also be low, biasing Q4 non-conductive. Determining the output of AND gate 36 and, thus, whether transistor Q2 is biased conductive or non-conductive is performed similarly as described above with respect to the activation of transistor Q4 for forward motor rotation. The feedback voltage at sense resistor 28 is compared by comparator 42 to the analog Ic signal to bias Q2 conductive when the feedback signal is of a lower magnitude. When Q2 is biased conductive, current flows through the motor windings, but in the opposite direction than for forward rotation of motor 14, resulting in a reverse direction of rotation.

When controller 12 directs motor 14 to displace piston 16 to effect a change in the pressure of the hydraulic system 18, static friction caused by contact between various sealing and support elements for piston 16 resists piston displacement. Because the friction is greatest when piston 16 is at rest, and decreases substantially when piston 16 is in motion, electric motor 14 must exert more torque to initially displace piston 16. Once piston 16 has initially been displaced, less motor torque may be applied and a more direct relation between current and force exerted by motor 14 may be established and relied upon for motor control.

Figure 4A:
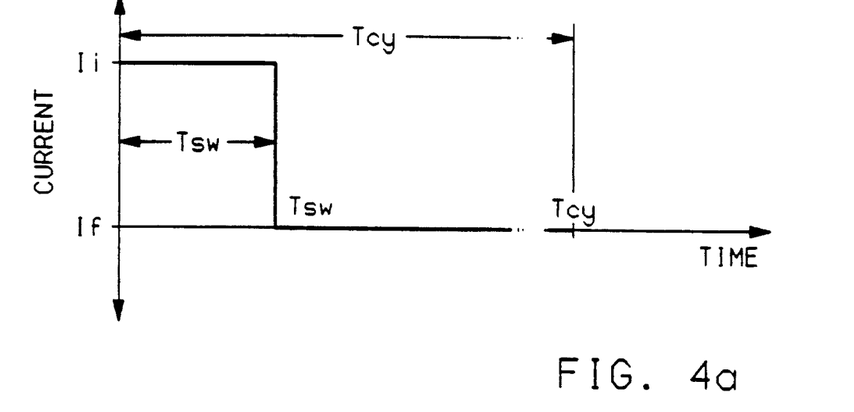
FIGS. 4a, 4b, and 4c depict control command waveforms which operate the electric motor of the electrohydraulic system.

FIG. 4a depicts one cycle Tcy of the control command used to apply hydraulic pressure. The control command repeats in successive time intervals of substantially the same duration Tcy, and consists of two current magnitudes Ii and If. Ii is the initial current applied for a varying duration Tsw, and is of a magnitude sufficient for motor 14 to initiate movement of piston 16 in a forward direction, exerting sufficient force to overcome the static friction which resists displacement of piston 16. At time Tsw, the current changes to a second current level If so that the combination of Ii for a time Tsw and If for a time (Tcy−Tsw) yields an average current which enables development of the desired hydraulic pressure. Application of Ii at a magnitude sufficient to displace piston 16, followed by If to obtain an average current, establishes a more direct relation between current and hydraulic pressure. By varying Tsw, a variety of hydraulic pressures may be developed. The relationship between the ratio of Tsw to Tcy, termed the duty cycle, and the hydraulic pressures are empirically established.

Figure 4B:
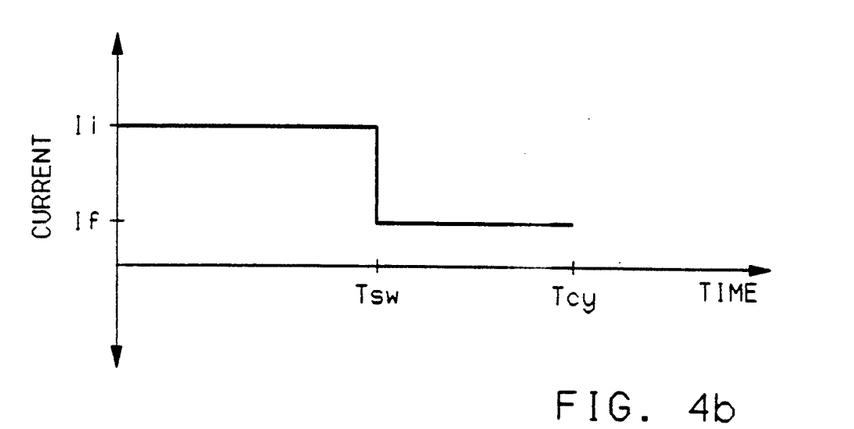
Figure 4C:
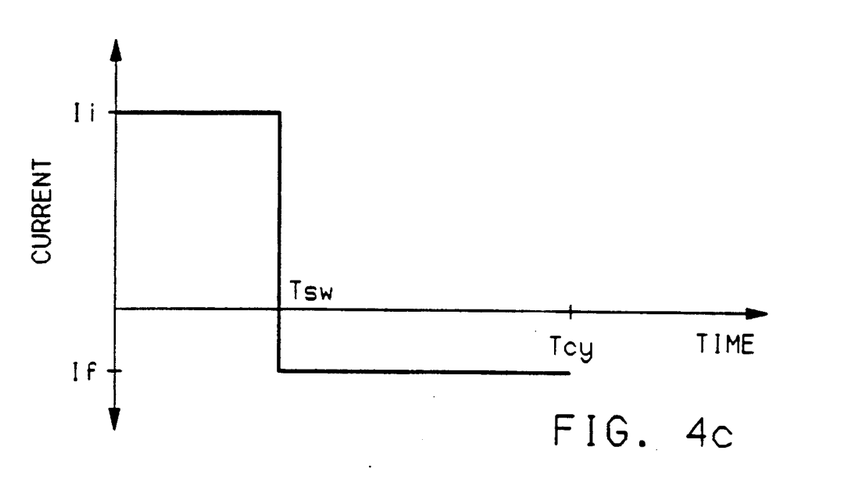

While the waveform for the apply current command of FIG. 4a depicts a positive Ii and a zero If, alternate waveforms as depicted in FIGS. 4b and 4c may also be commanded. In FIG. 4b, Ii and If are positive. Such a command may be used to apply force in a forward direction during application of Ii and to continue application of force in the same direction at a reduced torque during application of If. In FIG. 4c, Ii is positive, and If is negative. This waveform may be used to apply force in a forward direction at a relatively high rate during application of Ii, then to slow displacement of piston 16 quickly by commanding reverse motor rotation during If. Note that while the cycle time Tcy of the current command remains constant, the duty cycle is variable. Thus, great flexibility in achieving varying hydraulic pressures is realized by varying Ii and If, and also varying the duty cycle.

Waveforms of the control command to release hydraulic pressure are similar to those depicted in FIGS. 4a−4c except that because release of hydraulic pressure requires reversal of motor 14, Ii and If are of opposite polarities than for forward motor operation. The pressure release control command repeats in successive time intervals of substantially the same time duration Tcy, and consists of two current levels Ii and If. Accordingly, to control hydraulic pressure and pressure rate, Ii, If, and the duty cycle of the current release waveform may similarly vary for the pressure release command as for the pressure apply command. Ii is the initial current level applied for a duration of Tsw, and is of a magnitude sufficient for motor 14 to operate in a reverse direction with enough torque to overcome the static friction which resists displacement of piston 16. At time Tsw, the current changes to a second current level If so that the combination of Ii for a time Tsw and If for a time (Tcy −Tsw) yields an average release current which enables achievement of the desired hydraulic pressure at a desired pressure release rate. Furthermore, a direct relationship between the ratio of Tsw to Tcy, termed the duty cycle, and the hydraulic pressures and pressure rates may be established.

Tcy remains constant and is determined specifically in relation to the time response characteristics of motor 14 (the electrical time constant) and hydraulic system 18 (the mechanical time constant). The electrical time constant is a measure of the time lag between application of a control command and the change in torque developed by motor 14. The mechanical time constant is a measure of the time lag between the change in force exerted on piston 16 and fluid pressure change in hydraulic system 18. The mechanical time constant relates directly to the resistance to displacement of piston 16 resulting from a combined effect of mechanical inertia and frictional forces. The greater the resistance to displacement of piston 16, the greater the time lag. The electrical time constant is typically an order of magnitude less than the mechanical time constant, that is, motor 14 will respond an order of magnitude quicker to a change in current than hydraulic system 18 will respond to a change in force applied to piston 16.

When a control command of time duration Tcy is applied to motor 14, the time duration of the control command Tcy must be greater than the electrical time constant in order for the motor to exert force. However, in order to effectively control pressure, the time duration of the control command Tcy must be substantially less than than the mechanical time constant so that the control command may be updated at a frequency sufficient to enable satisfactory system performance. When the current level changes at Tsw, therefore, the hydraulic pressure varies minimally because the period of the control command is substantially less than the mechanical time constant.

Figure 5:
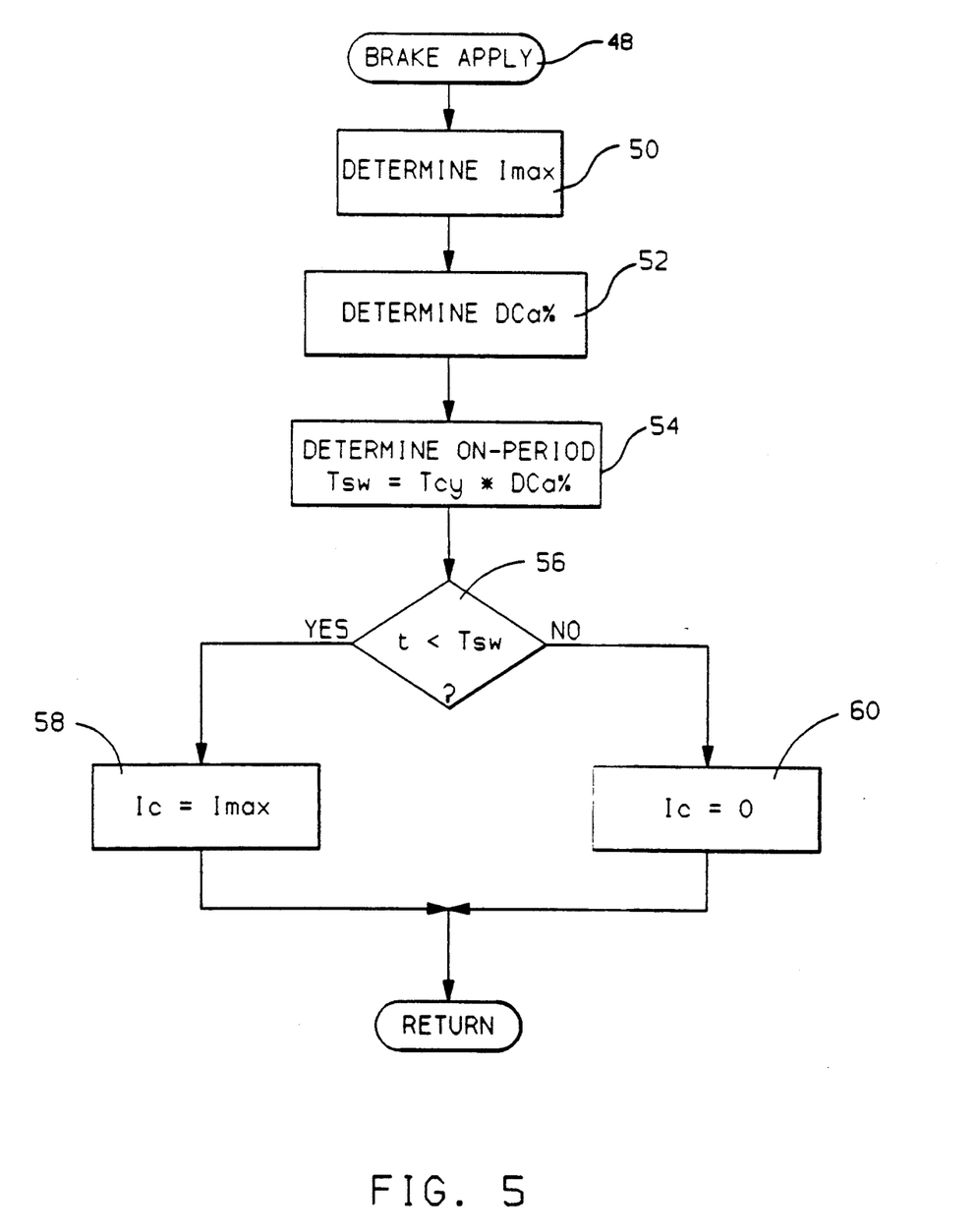
FIG. 5 is a flow diagram for the execution of a pressure apply command by the electronic controller of FIG. 1.

Referring to FIG. 5, a flow chart for executing a pressure apply command for the preferred embodiment as depicted using the current command waveform of FIG. 4a is shown. The pressure apply routine is entered at step 48. The maximum apply current Imax is determined at step 50. To implement only one of the waveforms in FIGS. 4a−4c, Imax would be fixed at Ii; however, in a system where a variety of waveforms as depicted in FIG. 4a−4c could be commanded, Imax would be a function of the force required to overcome static friction for a given set of operating conditions. The duty cycle DCa (the ratio of Tsw to Tcy) is determined from lookup tables stored in microprocessor 20 which map hydraulic pressures to the apply duty cycle DCa. Step 54 then calculates the apply time Tsw for which the initial current Ii will be applied. At step 56, the time t for which Ii has been applied is compared to the desired apply time Tsw. If t<Tsw, the current magnitude Ic is set to the maximum current Imax. With respect to the block diagram of FIGS. 2 and 3, enable signals EN and EN' are set high, direction signal DIR is set high, and the current magnitude Ic=Imax is output to D/A converter 40. If t > Tsw, the current command Ic is set to zero current, which is output to D/A converter 40 while EN, EN', and DIR remain in their present states.

Figure 6:
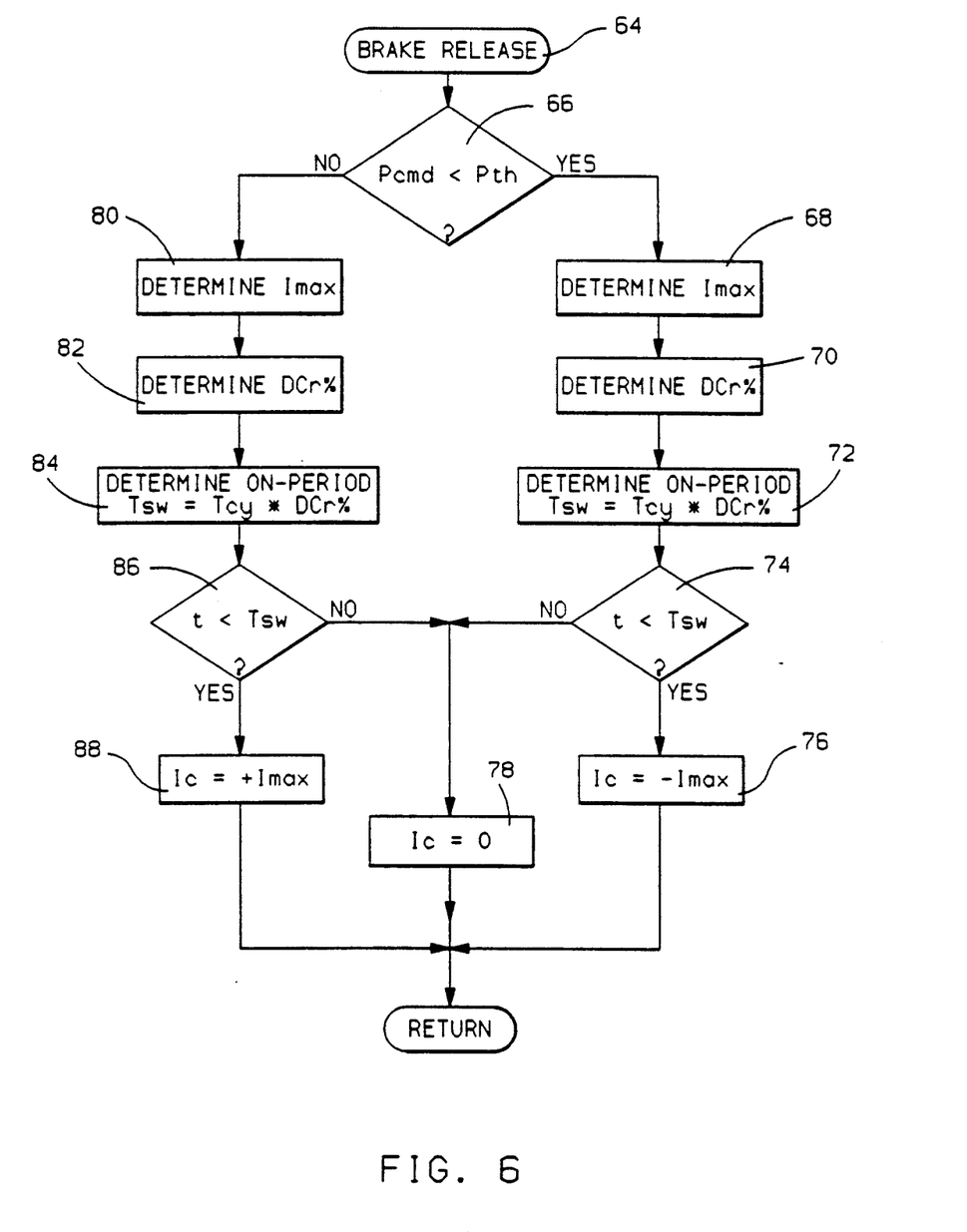
FIG. 6 is a flow diagram for the execution of a pressure release command by the electronic controller of FIG. 1.

Pressure release takes place in a similar manner to that described in FIG. 5, but also allows for varying pressure release rates to be implemented. Referring to FIG. 6, the routine is entered at step 64 upon a request for hydraulic pressure release. At step 66, the desired release rate Pcmd is compared to a threshold release rate Pth. Pcmd is the desired rate of release, and Pth is the crossover pressure at which a different release mode is implemented. If Pcmd is less than Pth (release rates are negative in sign), a relatively high pressure release rate is desired, and the motor is reversed by applying a negative Ii. At step 68 the maximum motor current Imax is determined. The release duty cycle DCr is determined at step 70 from lookup tables stored in microprocessor 20 which map hydraulic pressures to the release duty cycle DCr. Step 72 then calculates the time Tsw for which the initial current Ii will be applied. At step 74, the time t for which Ii has been applied is compared to the desired apply time Tsw. If t < Tsw, the current command Ic is set to −Imax, the negative of the maximum current. With respect to the block diagram of FIGS. 2 and 3, enable signals EN and EN' are set high, direction signal DIR is set low, and the current magnitude Ic=Imax is output to D/A converter 40. If t > Tsw, the current command Ic is set to zero current at step 78, which is output to D/A converter 40.

An additional release mode is implemented in this embodiment which utilizes the back pressure of hydraulic system 18 exerted against piston 16 to slowly displace piston 16 in a reverse direction. The corresponding current commanded in this instance initiates motor operation in a forward direction, but at a lesser force than the force the hydraulic fluid exerts on piston 16 to effectuate a slower pressure release, with the hydraulic fluid pressure driving piston 16 in a reverse direction. In this situation, the equivalent of an apply command is issued. Step 80 determines the maximum current Imax. Step 82 determines the release duty cycle DCr as a percentage of Tcy. At step 84, the apply time Tsw of Ii is determined. Step 86 tests whether t < Tsw. If yes, the current magnitude Ic is set to positive Imax at step 88. If t > Tsw, the current command magnitude Ic is set to zero.

In the implementations as described herein, because If=0 current, displacement of piston 16 may be halted in one of two modes, by coast braking or dynamic braking motor 14. When coast braking during a pressure apply, If is set to zero at Tsw, and all gate transistors Q1–Q4 are biased non-conductive. Freewheeling current flows through diodes D2 and D3 into the positive battery terminal until it decays to zero. In this mode, displacement of piston 16 is halted primarily due to frictional forces resisting further displacement and back pressure of the hydraulic system. To coast brake during a pressure release using a negative current, all gate transistors Q1–Q4 are again biased non-conductive. If Ii was negative before Tsw, freewheeling current flows through D4 and D1 into the positive battery terminal until it decays to zero. If pressure release occurred at a slower rate and Ii was positive before Tsw, as described in steps 80–88 of FIG. 6, coast braking occurs as freewheeling current flows as if a pressure apply had been executed as described herein. During pressure release, only the frictional forces that resist displacement of piston 16 halt its movement.

Dynamic braking of piston 16 occurs when induced back-emf current flows to generate a motor force opposite to the existing direction of displacement of piston 16. Lower gate transistors Q2 or Q4, depending on the direction of motor operation, are biased conductive to effectuate such a current flow. During a pressure apply, If is set to zero at Tsw, but EN, EN', and DIR are set so that Q2 is biased conductive. Accordingly, induced back-emf current will flow through the motor windings in the direction opposite that Ii traveled before Tsw, flowing through Q2 and D4. During a pressure release where Ii was negative, Q4 is biased conductive so that induced back-emf current will flow through the motor windings in an opposite direction that Ii traveled before Tsw, flowing through Q4 and D2. For the pressure release command described in steps 80–88 of FIG. 6, the induced back-emf is circulated as if a pressure apply command had been implemented. In each of the above cases of dynamic braking, the current flow will induce motor torque to oppose future displacement of piston 16. Dynamic braking thus will halt displacement of piston 16 in a shorter time than coast braking.

A second embodiment of this invention is similar to the first embodiment, but rather than measuring current to determine the force applied by electric motor 14, voltage is measured. That is, where the current magnitude Ic appears, a voltage magnitude Vc will replace it. This has the additional advantage that to implement the second embodiment as described herein, Vmax can be set in accordance with the battery voltage to implement a less expensive electro-hydraulic control system.

While this invention has been described in reference to the illustrated embodiment, it will be understood that the scope of the present invention is not limited thereto. Various modifications to the illustrated embodiment may occur to those skilled in the art, and it should be understood that systems incorporating such modifications may also fall within the scope of this invention, which is defined by the appended claims.

The embodiments of the invention in which an exclusive property or privilege is claimed are defined as follows:

1. A method of regulating hydraulic fluid pressure in a system including a piston displaceable to regulate the hydraulic fluid pressure and an electric motor coupled to the piston and responsive to motor current to generate a motor torque to displace the piston to effect control of the hydraulic pressure, the system having an electrical time constant, a mechanical time constant larger than the electrical time constant, and a static friction force, the method comprising the steps of:
generating a current command in each of a continuous series of successive current control periods, each current control period having a duration Tcy that is greater than the electrical time constant and less than the mechanical time constant, the current command in each current control period having a first current level Ii for a period Tsw and a second current level If for a period Tcy−Tsw; and
controlling the motor current to the generated current command levels to generate a motor torque corresponding to the motor current for displacing the piston to regulate the hydraulic pressure, wherein the hydraulic pressure is established at a value related to the average of the first and second current levels Ik and If over the control period Tcy.

2. The method of claim 1 wherein the first current level Ii is greater than the second current level If and is a level whereat the motor torque is greater than the static friction force, whereby movement of the piston is initiated by the first current level Ii in each current control period.

3. The method of claim 2 further including a step of adjusting the period of Tsw of the first current level Ii to establish a desired hydraulic fluid pressure.

4. The method of claim 1 wherein the second current level is zero.

* * * * *